United States Patent
Itou et al.

(10) Patent No.: US 11,845,458 B2
(45) Date of Patent: Dec. 19, 2023

(54) VEHICLE DRIVE FORCE CONTROL METHOD AND VEHICLE DRIVE FORCE CONTROL DEVICE

(71) Applicant: NISSAN MOTOR CO., LTD., Yokohama (JP)

(72) Inventors: Kensuke Itou, Kanagawa (JP); Tatsuya Suzuki, Kanagawa (JP); Masaaki Nawano, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/629,486

(22) PCT Filed: Jun. 8, 2020

(86) PCT No.: PCT/JP2020/022593
§ 371 (c)(1),
(2) Date: Jan. 24, 2022

(87) PCT Pub. No.: WO2021/250761
PCT Pub. Date: Dec. 16, 2021

(65) Prior Publication Data
US 2022/0266848 A1 Aug. 25, 2022

(51) Int. Cl.
*B60W 50/12* (2012.01)
*B60W 40/068* (2012.01)
*B60W 50/10* (2012.01)

(52) U.S. Cl.
CPC .......... *B60W 50/12* (2013.01); *B60W 40/068* (2013.01); *B60W 50/10* (2013.01); *B60W 2520/26* (2013.01); *B60W 2552/40* (2020.02)

(58) Field of Classification Search
CPC .... B60W 50/12; B60W 50/10; B60W 40/068; B60W 2552/40; B60W 2520/26
See application file for complete search history.

(56) References Cited

U.S. PATENT DOCUMENTS

| | | | |
|---|---|---|---|
| 2020/0108716 A1* | 4/2020 | Iwazaki | F16H 48/05 |
| 2020/0307618 A1* | 10/2020 | Yoshizawa | B60W 50/14 |
| 2021/0354697 A1* | 11/2021 | Mitsumoto | B60W 30/18145 |
| 2022/0017118 A1* | 1/2022 | Shinomoto | B60W 30/10 |
| 2022/0212641 A1* | 7/2022 | Takahashi | B60T 8/1706 |
| 2022/0266848 A1* | 8/2022 | Itou | B60W 50/10 |
| 2022/0319250 A1* | 10/2022 | Kakutani | G06T 11/203 |
| 2022/0327870 A1* | 10/2022 | Goto | G07C 5/02 |

(Continued)

FOREIGN PATENT DOCUMENTS

| | | |
|---|---|---|
| CN | 107512262 A | 12/2017 |
| JP | 2008-87680 A | 4/2008 |

(Continued)

*Primary Examiner* — Peter D Nolan
*Assistant Examiner* — Wae L Louie
(74) *Attorney, Agent, or Firm* — Foley & Lardner LLP

(57) ABSTRACT

A vehicle drive force control method according to the present invention includes calculating an estimated friction circle on the basis of longitudinal and lateral accelerations of a vehicle, limiting a drive force of the vehicle depending on a size of the estimated friction circle, and limiting a change rate of the size of the estimated friction circle during vehicle traveling on the basis of a tire generation force. The method further the change rate as the tire generation force increases.

6 Claims, 7 Drawing Sheets

(56) References Cited

U.S. PATENT DOCUMENTS

2022/0379858 A1* 12/2022 Goh .......................... B60T 7/12
2023/0054246 A1*  2/2023 Wang .................... B60W 40/13

FOREIGN PATENT DOCUMENTS

| JP | 2008-273315 A | 11/2008 |
|---|---|---|
| JP | 2009-56884 A | 3/2009 |
| WO | WO 2013/076902 A1 | 5/2013 |

* cited by examiner

VEHICLE DRIVE FORCE CONTROL METHOD AND VEHICLE DRIVE FORCE CONTROL DEVICE

TECHNICAL FIELD

The present invention relates to a vehicle drive force control.

BACKGROUND ART

JP2009-56884A discloses a method of estimating a friction circle on the basis of a frictional force between a tire and a road surface and limiting a drive force on the basis of the estimated friction circle.

SUMMARY OF INVENTION

According to the aforementioned prior art, when a friction coefficient of the road surface changes, the drive force also changes. For example, when the friction coefficient of the road surface is high like a dry or wet road surface, and the friction coefficient changes in a state where a large tire generation force is generated, a vehicle behavior changes immediately. Therefore, even when the change of the estimated friction circle fast follows the change of the friction coefficient, the vehicle behavior is unlikely to become unstable.

However, when the friction coefficient is small, for example, on an icy or snowy road surface where a large variation in the degree of snow compression or scattered icy parts exist, the road surface condition frequently changes, and the change amount of the friction coefficient is large. As a result, when the friction coefficient is small, the change amount of the size of the estimated friction circle becomes large. In addition, when the friction coefficient is small, a large tire generating force is hardly generated and the vehicle behavior changes slowly. In this situation, if the change of the estimated friction circle rapidly follows the change of the friction coefficient, the drive force abruptly changes, and the vehicle behavior becomes unstable.

It is therefore an object of the present invention to control the drive force to suppress instability of the vehicle behavior even on a road surface having a small friction coefficient.

According to an embodiment of the present invention, a vehicle drive force control method comprising calculating an estimated friction circle on the basis of longitudinal and lateral accelerations of a vehicle, limiting a drive force of the vehicle depending on a size of the estimated friction circle, and limiting a change rate of a size of the estimated friction circle during vehicle traveling on the basis of a tire generation force is provided. In this control method, the change rate is set to increase as the tire generation force increases.

The details as well as other features and advantages of the present invention are set forth in the remainder of the specification and are shown in the accompanying drawings.

DESCRIPTION OF EMBODIMENTS

Hereinafter, an embodiment of the present invention will be described with reference to the accompanying drawings.

<System Configuration>

Figure 1:
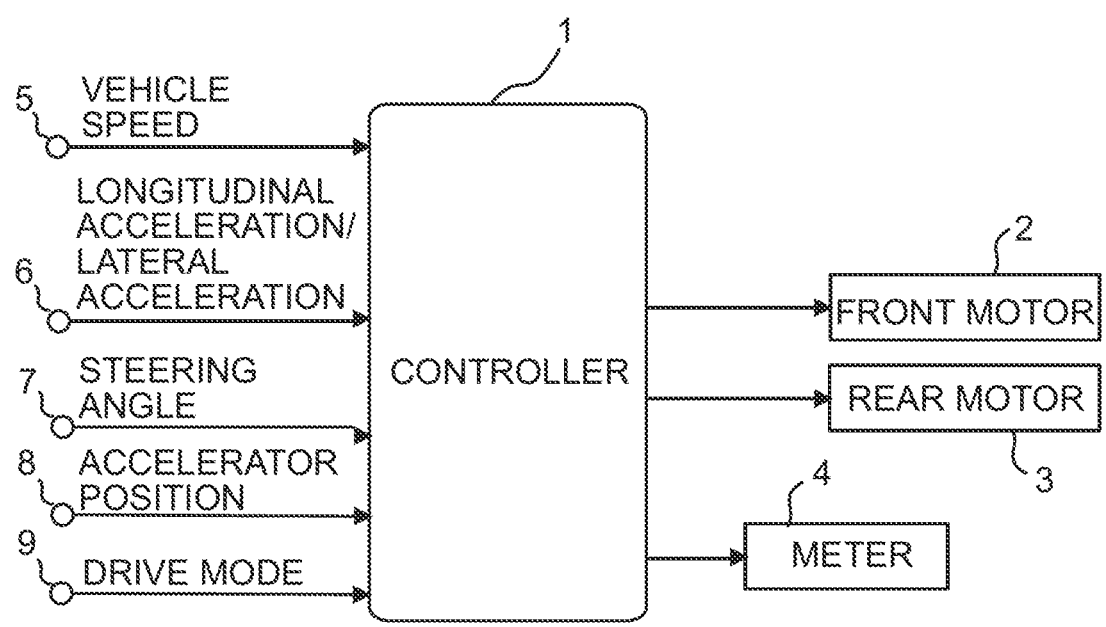
FIG. 1 is a schematic diagram of a control system according to an embodiment of the present invention.

FIG. 1 is a schematic diagram of a control system according to the embodiment of the present invention.

The control system has sensors of various kinds described below, a controller 1 as a control unit that executes various controls including a drive force control of a vehicle based on information obtained from the sensors, front and rear motors 2 and 3 as driving sources of the vehicle, and a meter 4 for notifying a driver that the drive force is under limitation.

The sensors include a vehicle speed sensor 5 that detects a vehicle speed, an acceleration sensor 6 as a longitudinal acceleration detection unit and a lateral acceleration detection unit that detect longitudinal and lateral accelerations of the vehicle, a steering angle sensor 7 that detects a steering angle of the vehicle, an accelerator position sensor 8 that detects an accelerator pedal depression amount of the vehicle (also referred to as "accelerator opening"), and a mode selector 9 operated by the driver to select a drive mode of the vehicle.

The controller 1 comprises a microcomputer provided with a central processing unit (CPU), a read-only memory (ROM), a random access memory (RAM), and an input/output interface (I/O interface). The controller 1 may also be constituted by a plurality of microcomputers.

The front motor 2 generates a drive force transmitted to two front wheels, and the rear motor 3 generates a drive force transmitted to two rear wheels. The drive forces generated by the front and rear motors 2 and 3 are controlled by the controller 1. Details of the control will be described below.

Although the drive source according to the present embodiment is constituted by the front and rear motors 2 and 3, any one or both of them may be substituted with an internal combustion engine.

<Drive Force Control>

First, an outline of the drive force control according to the present embodiment will be described.

As described above, the vehicle comprises the front and rear motors 2 and 3. The controller 1 is configured to set a target drive force of the entire vehicle on the basis of the accelerator pedal depression amount by the driver, and to determine distribution of the drive force of the front and rear motors 2 and 3 to realize the target drive force. This distribution is performed depending on sizes of friction circles of the front and rear wheels such that the wheels having a larger friction circle have a larger drive force. For example, when the friction circles of the front and rear wheels have the same size, the share of the drive force is set to 50:50. When the friction circle of the front 1 wheels is larger than the friction circle of the rear wheels, the share of the front wheels is set to be larger than the share of the rear wheels. When the friction circle of the front wheels is smaller than the friction circle of the rear wheels, the share of the rear wheels is set to be larger than the share of the front wheels. It is noted that, when the target drive force can be achieved just by any one of the front and rear motors 2 and 3, it is possible to allocate the whole target drive force to only one of the motors.

Figure 2:
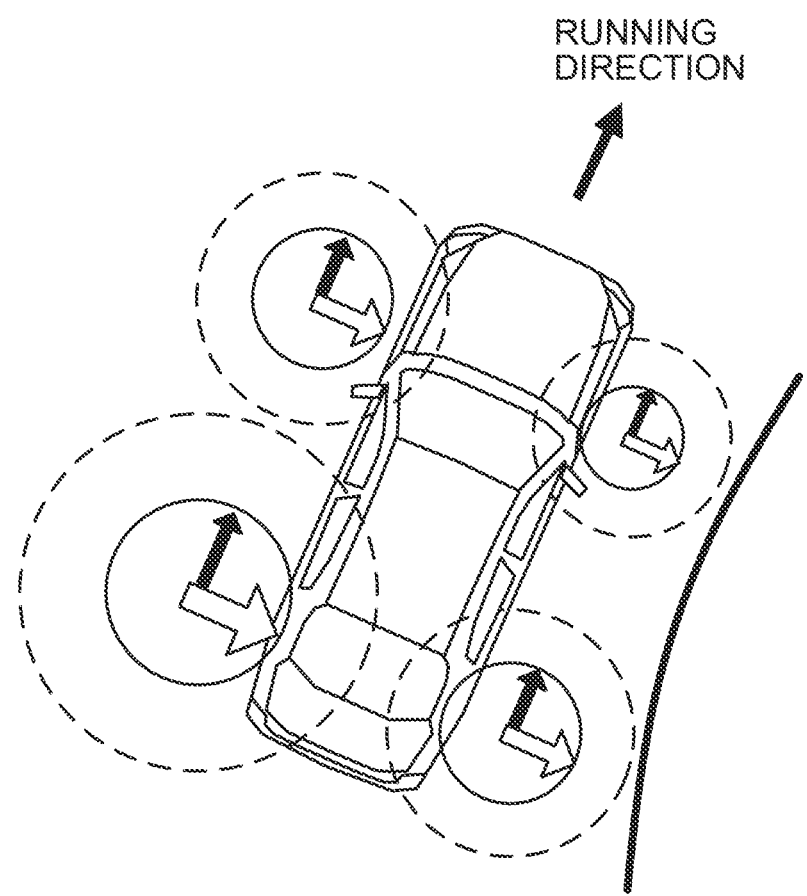
FIG. 2 is a diagram illustrating examples of friction circles when a vehicle is turning.

The friction circle of the front wheels denotes the smaller one of the friction circles of the two front wheels. The same applies to the friction circle of the rear wheels. For example, assuming that a vehicle is turning as shown in FIG. 2, the loads on the inner wheels of both the front and rear wheels are smaller than the loads on the outer wheels, so that the inner wheels have smaller friction circles than those of the outer wheels. Note that the solid line circle in FIG. 2 indicates a friction circle, the broken line circle indicates a circle whose radius is a tire generation force determined from the target drive force and a target lateral force, which will be described below, the black arrow in the friction circle indicates a drive force, and the white arrow indicates a lateral force.

A target tire generation force is determined by the target lateral force determined by the steering angle and vehicle speed and the aforementioned target drive force. During turning, when the target tire generation force exceeds the friction circle of the wheel, the wheel slips or skids, and the vehicle behavior becomes unstable. In this regard, the controller 1 limits the target drive force such that the tire generation force falls within the friction circle.

Figure 3:
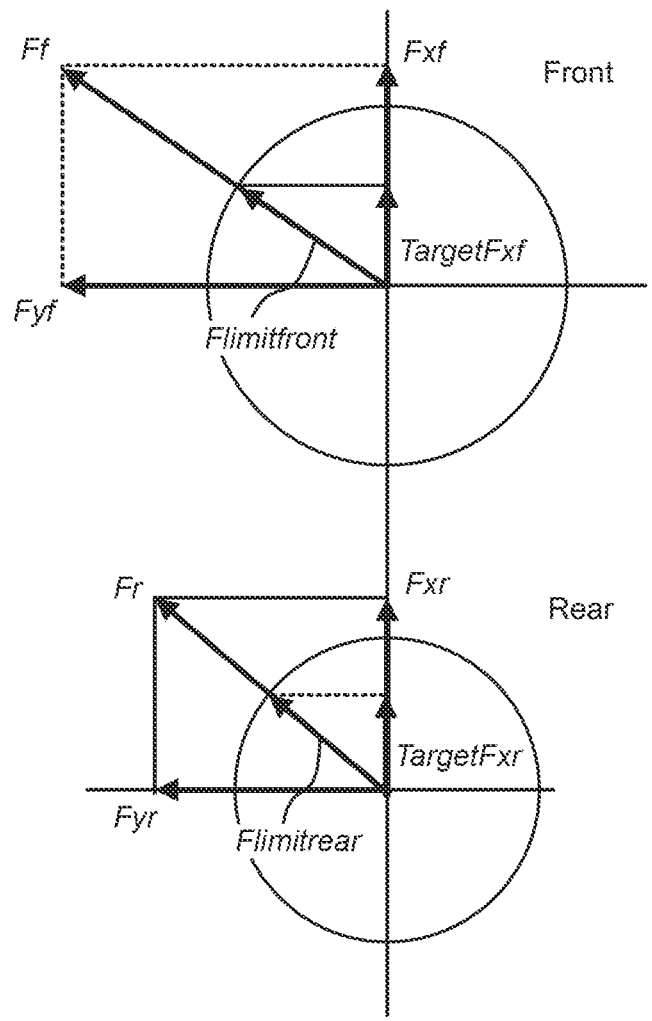
FIG. 3 is a diagram illustrating friction circles of front and rear wheels of the vehicle for explaining drive force limitation.

FIG. 3 illustrates friction circles of the front and rear wheels for explaining the limited target drive force. Here, it is assumed that the friction circle of the front wheel is larger than that of the rear wheel.

The target drive force based on the accelerator position is referred to as "Fx", the drive force distributed to the front wheel is referred to as "Fxf", and the drive force distributed to the rear wheel is referred to as "Fxr". In addition, the lateral force of the front wheel based on the steering angle and the vehicle speed is referred to as "Fyf", and the lateral force of the rear wheel is also referred to as "Fyr".

First, explanation will be made with respect to the front wheels. As shown in the drawings, a tire generation force Ff of the front wheel, which is a resultant force of the drive force Fxf of the front wheel and the lateral force Fyf of the front wheel, exceeds the friction circle of the front wheel. In this situation, the front wheel slips or skids, so that the vehicle behavior becomes unstable. In this regard, a limited tire generation force of the front wheel obtained by limiting the tire generation force Ff of the front wheel within the friction circle is defined as "Flimitfront", and a drive force component thereof is defined as "target drive force TargetFxf of the front wheel". The target drive force TargetFxf is expressed by Equation (1).

$$TargetFxf = \left( Fxf \times \frac{Flimitfront}{\sqrt{Fxf^2 + Fyf^2}} \right) \quad (1)$$

The same applies to the rear wheel, and a target drive force TargetFxr of the rear wheel is expressed by Equation (2) using a target drive force Fxr of the rear wheel, a lateral force Fyr of the rear wheel, a tire generation force Fr of the rear wheel, which is a resultant force of the forces Fxr and Fyr, and a limited tire generation force Flimitrear of the rear wheel.

$$TargetFxr = \left( Fxr \times \frac{Flimitrear}{\sqrt{Fxr^2 + Fyr^2}} \right) \quad (2)$$

Then, the resultant force of the limited target drive force TargetFxf of the front wheel and the limited target drive force TargetFxr of the rear wheel becomes the limited target drive force TargetFx.

Meanwhile, when the road surface condition changes during traveling, the size of the friction circle changes, and the limited target drive force TargetFx also changes accordingly. When the road surface has a large friction coefficient (also referred to as "high-μ road") like a dry or wet paved road, even if the road surface condition changes, and the frictional resistance changes as a result, the magnitude of the change is insignificant. In addition, since the allowable lateral force increases on a high-μ road, the time until the change of the road surface condition influences on the vehicle behavior is short. Therefore, on the high-μ road, there is no problem even when the change of the limited target drive force TargetFx immediately follows the change of the road surface condition.

However, on a road surface having a small friction coefficient (also referred to as "low-μ road") such as a snowy road, since the degree of snow compaction is not constant, and there are icy parts due to compaction, there is a case where the friction coefficient changes largely and abruptly. In addition, since the tire generation force is small on a low-μ road, the change of the vehicle behavior caused by the change of the friction coefficient occurs gently. On such a low-μ road, if the limited target drive force TargetFx changes to immediately follow the change of the friction coefficient, the vehicle behavior becomes unstable.

It is possible to suppress instability of the vehicle behavior on a low-μ road by slowing the change rate of the limited target drive force by applying filtering. However, simple filtering degrades a response of the limited target drive force on the high-μ road.

In this regard, according to the present embodiment, in order to obtain both the response on the high-μ road and a stable vehicle behavior on the low-μ road, the control described below is executed.

Figure 4:
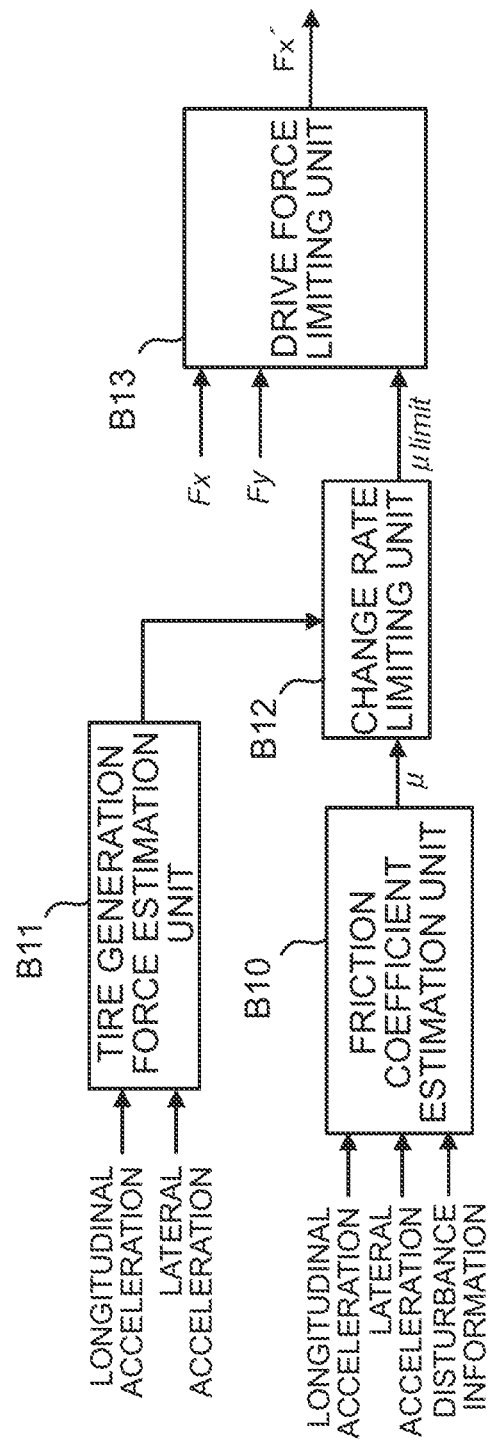
FIG. 4 is a block diagram illustrating the drive force limitation.

FIG. 4 is a block diagram illustrating the drive force control executed by the controller 1. It is noted that this block diagram shows functions of the controller 1 and does not depict physical entities.

A friction coefficient estimation unit B10 is configured to estimate the friction coefficient estimation value μ, which is an estimated value of the friction coefficient, on the basis of the current longitudinal and lateral accelerations and disturbance information. The disturbance information includes, for example, degrees of rolling and pitching of the vehicle or a degree of wandering, which serves as a basis for estimating a wheel load. As a method of calculating the friction coefficient estimation value μ, any technique known in the art may be employed. For example, on the assumption that the tire generation force determined from the current longitudinal and lateral accelerations falls within the friction circle, the tire generation force obtained by increasing the current longitudinal and lateral accelerations by a predetermined offset amount is instructed, and the increase caused by the aforementioned offset amount is repeated until the tire generation force actually reaches the limitation. When the increase of the longitudinal or lateral acceleration slows down below a predetermined value with respect to the increase of the instructed value of the tire generation force, it is determined that the tire generation force has reached the limitation, and the friction coefficient estimation value μ is calculated from the tire generation force and the wheel load at that time.

A tire generation force estimation unit B11 is configured to estimate the current tire generation force on the basis of the current longitudinal and lateral accelerations. In addition, acceleration Gv of the vehicle is calculated on the basis of the estimated tire generation force and the wheel load, and is output to a change rate limiting unit B12 described below. It is noted that the acceleration Gv of the vehicle may be calculated by synthesizing the current longitudinal and lateral accelerations.

The change rate limiting unit B12, is configured to limit the change rate of the friction coefficient estimation value μ on the basis of the acceleration Gv as described later. This limitation can be regarded as performing the limitation on the basis of the tire generation force. This is because the tire generation force is a product of the sum of the wheel loads of the four wheels (that is, a vehicle weight) and the vehicle acceleration, the sum of the wheel loads does not change significantly during vehicle traveling, and hence there is a proportional relationship between the tire generation force and the vehicle acceleration.

Further, the limitation of the change rate of the friction coefficient estimation value μ based on the acceleration Gv can also be regarded as the limitation based on the friction coefficient of the road surface. This is because the tire generating force can be expressed as a product of the sum of the wheel loads of the four wheels (that is, the vehicle weight), the gravitational acceleration, and the friction coefficient. Herein, the gravitational acceleration is a constant value, the sum of the wheel loads does not change significantly during vehicle traveling, and hence there is a proportional relationship between the tire generation force and the friction coefficient of the road surface.

Figure 5:
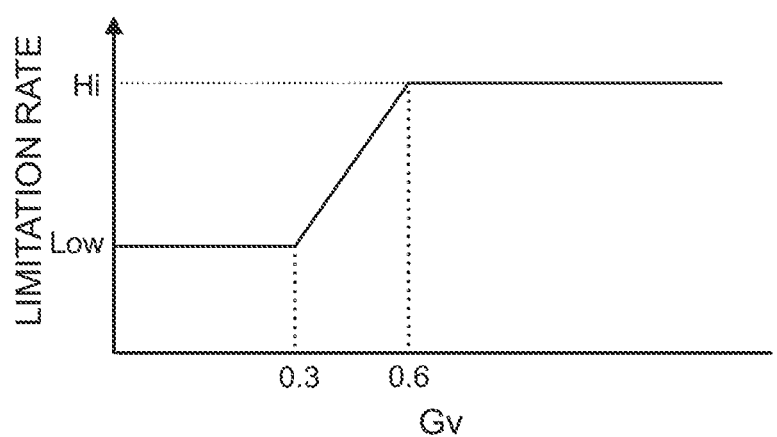
FIG. 5 is a diagram illustrating an example of a limitation rate map.

The change rate limiting unit B12 is configured to limit the change rate of the friction coefficient estimation value μ using the acceleration Gv calculated by the tire generation force estimation unit B11, and output a limited friction coefficient estimation value μlimit to a drive force limiting unit B13 described below. For example, a limitation rate is set using the map shown in FIG. 5, the change amount between the friction coefficient estimation values μ input currently and previously into the change rate limiting unit B12 is limited by using the limitation rate, and the limited value is set as the limited friction coefficient estimation value μlimit. The value "0.3" on the abscissa in FIG. 5 is an example of the acceleration Gv on a snowy road, and the value "0.6" is an example of the acceleration Gv on a wet road surface and a dry road surface. Furthermore, the values "Low" and "Hi" of the limitation rate in FIG. 5 are values set depending on the specification of the vehicle to which the present embodiment is applied, and are set through matching.

As shown in FIG. 5, the limitation rate is relatively small on a snowy road and relatively large on a wet road surface and a dry road surface. That is, the change rate of the friction coefficient estimation value μ is relatively small on a low-μ road such as a snowy road, and relatively large on a high-μ road such as a wet road surface and a dry road surface. It is noted that the acceleration Gv on the abscissa may be substituted with the friction coefficient estimation value μ of the road surface. Even in this case, the friction coefficient μ of a snowy road is "0.3", and the friction coefficients μ of a wet road surface and a dry road surface are "0.6".

The drive force limiting unit B13 is configured to set the limited drive force Fx' on the basis of the target drive force Fx based on the accelerator position, the lateral force Fy based on the steering angle and the vehicle speed, and the limited friction coefficient estimation value μlimit. In addition, the limited drive force Fx' is distributed to the front and rear wheels depending on the sizes of the friction circles as described above.

By controlling the drive force as described above, the change of the size of the friction circle depending on the change of the limited friction coefficient estimation value μlimit becomes relatively gentle on the low-μ road and relatively fast on the high-μ road.

Figure 6:
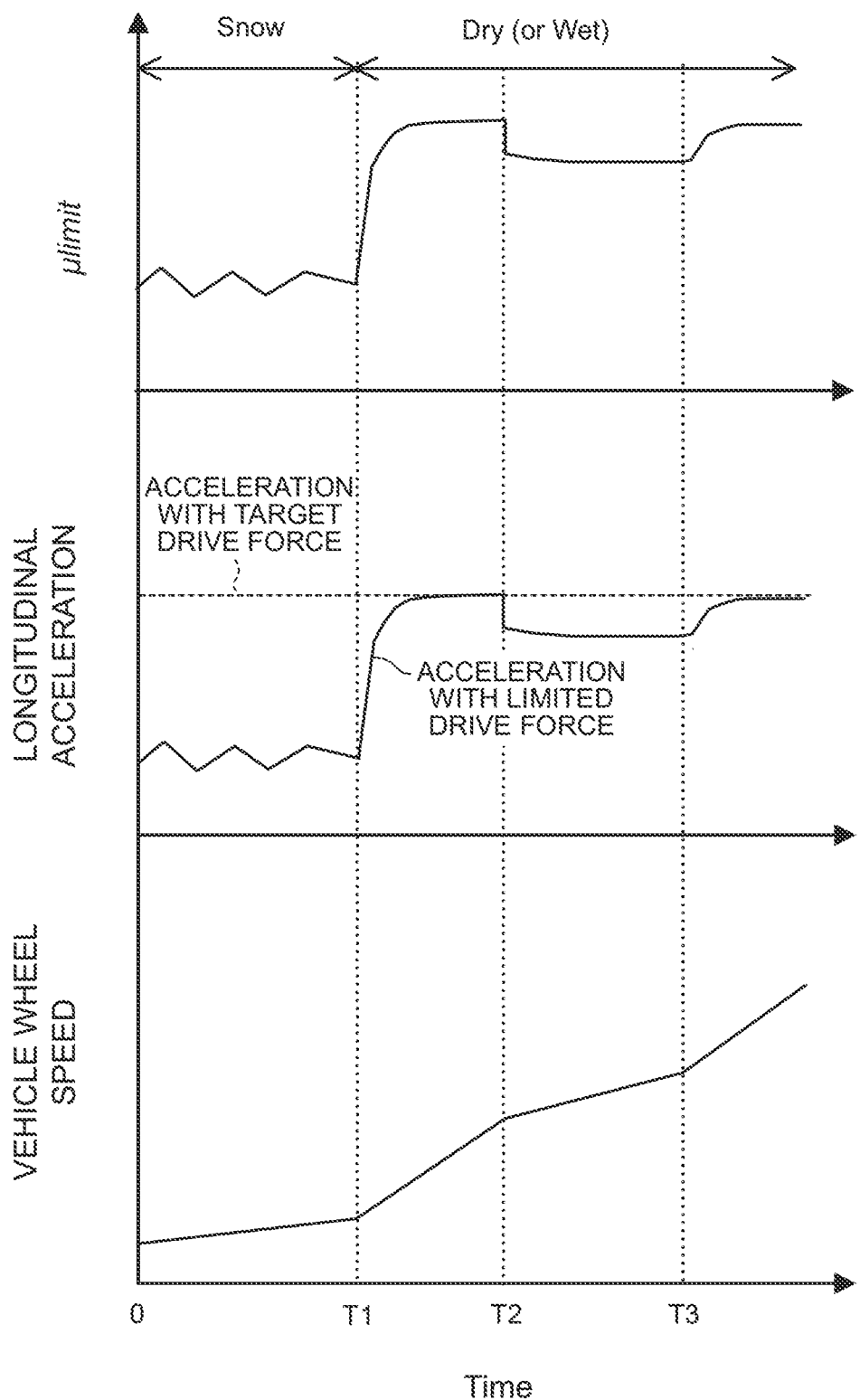
FIG. 6 is a timing chart illustrating results of execution of the drive force limitation according to the embodiment of the present invention.
Figure 7:
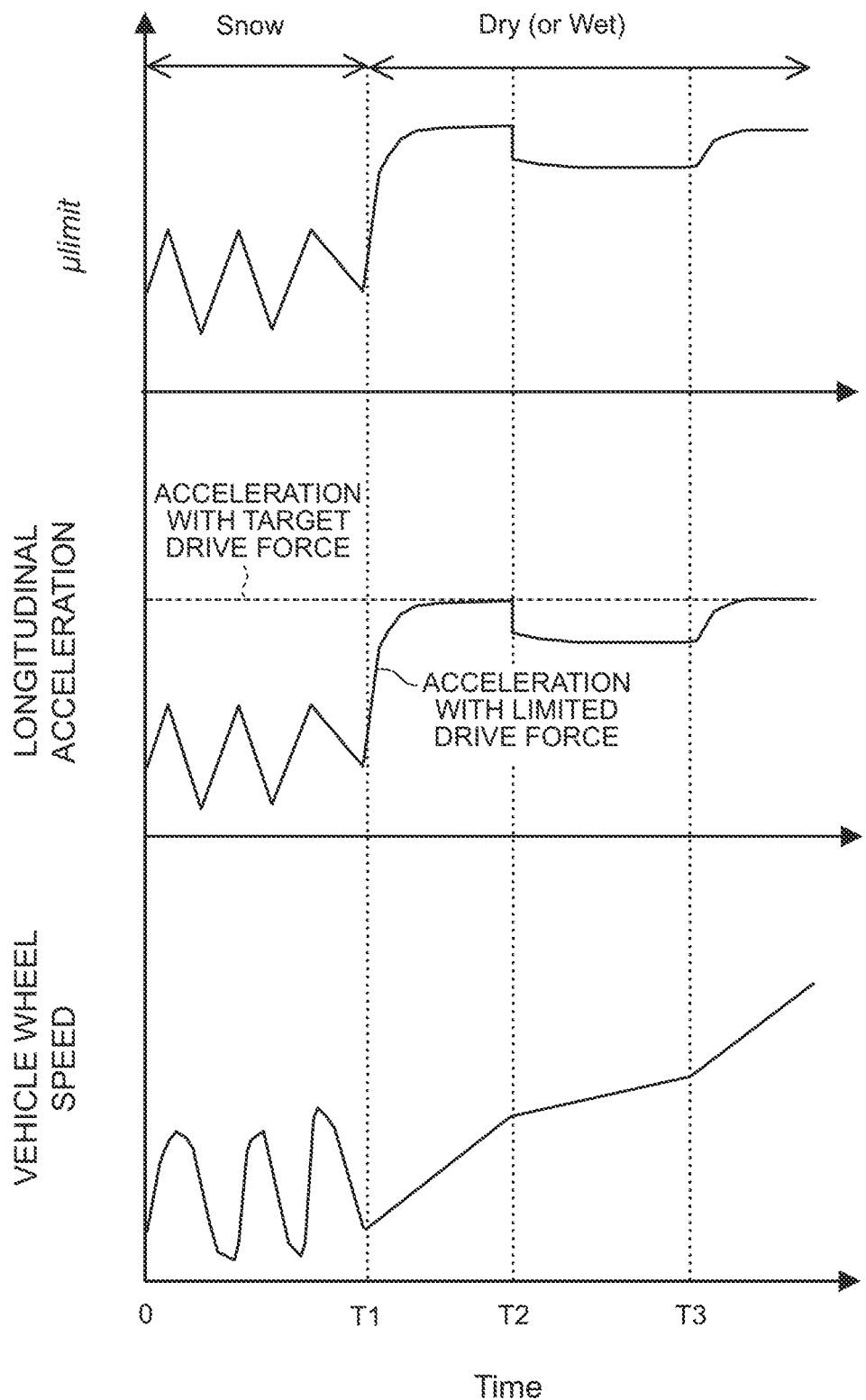
FIG. 7 is a timing chart illustrating a comparative example.

FIG. 6 is a timing chart when the drive force control described above is executed. FIG. 7 is a timing chart as a comparative example when the change rate limitation according to the present embodiment is not applied.

Both FIGS. 6 and 7 show a case where the target drive force is constant, and the vehicle travels on a snowy road from a timing 0 to a timing T1, on a dry road surface from the timing T1 to a timing T2, on a wet road surface from the timing T2 to a timing T3, and on a dry road surface again after the timing T3.

As described above, on the snowy road, the degree of snow compaction is not uniform, and it is icy in some places, so that the friction coefficient on the road surface increases or decreases frequently and rapidly. In this situation, when the change rate of the friction coefficient estimation value μ is not limited, or in other words, when the change rate of the size of the estimated friction circle is not limited, a fluctuation of the friction coefficient estimation value μ becomes large as shown in FIG. 7. When the drive force is limited in response to the friction coefficient estimation value μ significantly fluctuating in this manner, the fluctuation of the limited drive force also becomes large, so that the fluctuation of the longitudinal acceleration also becomes large. As a result, a fluctuation of the wheel speed also becomes large, which makes the vehicle behavior unstable. It is noted that the fluctuation referred to here is a difference width between the increase and decrease repeatedly alternating.

In contrast, when the change rate of the friction coefficient estimation value μ on a low-μ road is limited so as to be relatively slow as in the present embodiment, as shown in FIG. 6, the fluctuation of the limited friction coefficient estimation value μlimit becomes smaller than that of FIG. 7. Accordingly, the fluctuation of acceleration caused by the limited drive force is also reduced, and as a result, the wheel speed increases monotonically, so that it is possible to suppress unstable vehicle behavior.

Meanwhile, on a dry or wet road surface after the timing T1, the limitation of the change rate of the friction coefficient estimation value μ of the present embodiment becomes looser than that of the snowy road. Therefore, the change rate of the limited friction coefficient estimation value μlimit becomes equivalent to that of the comparative example. For this reason, there is no difference between FIGS. 6 and 7 after the timing T1. For example, when the road surface changes from a dry road surface to a wet road surface at the timing T2, the limited friction coefficient estimation value μlimit of FIG. 6 immediately decreases, and the acceleration caused by the limited drive force also immediately decreases accordingly. That is, according to the present embodiment, it is possible to secure the response to the change of the road surface condition on a high-μ road and suppress unstable vehicle behavior caused by a change of the road surface condition on a low-μ road.

It is noted that, in order to limit the change rate of the friction coefficient estimation value μ, the change rate may increase as the accelerator pedal depression amount increases. For example, the change rate limiting unit B12 of FIG. 4 may be configured to read the accelerator position, so that the limitation rate of FIG. 5 is corrected to be larger as the accelerator position increases. As the accelerator pedal depression amount increases, the driver demands a higher acceleration, and a tolerance for the instability of the vehicle behavior also increases. Therefore, in order to give priority to the driver's acceleration intention, the change rate is set to be larger as the accelerator pedal depression amount increases.

As described above, in the vehicle drive force control method according to the present embodiment, the estimated friction circle is calculated on the basis of the longitudinal and lateral accelerations, the drive force is limited depending on the size of the estimated friction circle, and the change rate of the size of the estimated friction circle during vehicle traveling is limited on the basis of the tire generation force. In addition, in this drive force control method, the limited change rate of the size of the estimated friction circle is increased as the tire generation force increases. As a result, it is possible to suppress the instability of the vehicle behavior on a low-μ road. Furthermore, it is possible to secure the response of the drive force control on a high-μ road.

In the vehicle drive force control method according to the present embodiment, the change rate of the size of the estimated friction circle increases as the accelerator pedal depression amount increases. As a result, it is possible to satisfy a driver's acceleration intention while suppressing unstable vehicle behavior.

In the vehicle drive force control method according to the present embodiment, the estimated friction coefficient of the road surface is calculated on the basis of the longitudinal and lateral accelerations, the drive force is limited depending on a magnitude of the estimated friction coefficient, and the change rate of the magnitude of the estimated friction coefficient during vehicle traveling is limited on the basis of the magnitude of the estimated friction coefficient. In addition, in this drive force control method, the limited change rate of the magnitude of the estimated friction coefficient increases as the estimated friction coefficient increases. As a result, it is possible to suppress the instability of the vehicle behavior on a low-μ road. In addition, it is possible to secure the response of the drive force control on a high-μ road.

In the vehicle drive force control method according to the present embodiment, the change rate of the magnitude of the estimated friction coefficient increases as the accelerator pedal depression amount increases. As a result, it is possible to satisfy the driver's acceleration intention while suppressing the instability of the vehicle behavior.

Although the invention has been described above with reference to certain embodiments, the invention is not limited to the embodiments described above. Modifications and variations of the embodiments described above will occur to those skilled in the art, within the scope of the claims. The embodiments of this invention in which an exclusive property or privilege is claimed are defined as follows:

The invention claimed is:

1. A vehicle drive force control method comprising:
   calculating an estimated friction circle on the basis of longitudinal and lateral accelerations of a vehicle;
   limiting a drive force of the vehicle depending on a size of the estimated friction circle; and
   limiting a change rate of the size of the estimated friction circle during vehicle travel based on a tire generation force,
   wherein the change rate is limited less as the tire generation force increases.

2. The vehicle drive force control method according to claim 1, wherein
   the change rate of the size of the estimated friction circle is set to increase as an accelerator pedal depression amount increases.

3. A vehicle drive force control method comprising:
   calculating an estimated friction coefficient of a road surface on the basis of longitudinal and lateral accelerations of a vehicle;
   limiting a drive force depending on a magnitude of the estimated friction coefficient; and
   limiting a change rate of the magnitude of the estimated friction coefficient during vehicle travel based on the magnitude of the estimated friction coefficient,
   wherein the change rate is limited less as the estimated friction coefficient increases.

4. The vehicle drive force control method according to claim 3, wherein
   the change rate of the magnitude of the estimated friction coefficient is set to increase as an accelerator pedal depression amount increases.

5. A vehicle drive force control device comprising:
   a longitudinal acceleration detection unit configured to detect a longitudinal acceleration of a vehicle;
   a lateral acceleration detection unit configured to detect a lateral acceleration of the vehicle; and
   a control unit configured to:
     calculate an estimated friction circle based on the longitudinal and lateral accelerations,
     limit a drive force depending on a size of the estimated friction circle, and
     limit a change rate of the size of the estimated friction circle during vehicle travel based on a tire generation force,
   wherein the control unit is further configured to limit the change rate of the size of the estimated friction circle less as the tire generation force increases.

6. A vehicle drive force control device comprising:
   a longitudinal acceleration detection unit configured to detect a longitudinal acceleration of a vehicle;
   a lateral acceleration detection unit configured to detect a lateral acceleration of the vehicle; and
   a control unit configured to:
     calculate an estimated friction coefficient of a road surface based on the longitudinal and lateral accelerations,
     limit a drive force depending on a magnitude of the estimated friction coefficient, and
     limit a change rate of the magnitude of the estimated friction coefficient during vehicle travel based on the magnitude of the estimated friction coefficient,
   wherein the control unit is further configured to limit the change rate of the magnitude of the estimated friction coefficient less as the estimated friction coefficient increases.

* * * * *